United States Patent [19]

Covington

[11] 4,245,069
[45] Jan. 13, 1981

[54] POLYSILOXANE COMPOSITION

[75] Inventor: William S. Covington, West Cornwall, Conn.

[73] Assignee: Permavision, Paramus, N.J.

[21] Appl. No.: 973,818

[22] Filed: Dec. 28, 1978

Related U.S. Application Data

[63] Continuation-in-part of Ser. No. 677,246, Apr. 15, 1976, Pat. No. 4,169,119.

[51] Int. Cl.³ ............................................. C08L 83/04
[52] U.S. Cl. .......................... 525/479; 260/37 SB; 351/160 R
[58] Field of Search ................ 525/479; 351/160; 260/37 SB

[56] References Cited

U.S. PATENT DOCUMENTS

| | | | |
|---|---|---|---|
| 2,560,498 | 7/1951 | Warrick | 528/43 |
| 2,823,218 | 2/1958 | Speier et al. | 260/3 |
| 2,970,150 | 1/1961 | Bailey | 260/348 |
| 2,976,576 | 3/1961 | Wichterle et al. | 260/29.6 H |
| 3,228,741 | 1/1966 | Becker | 351/160 |
| 4,136,250 | 1/1979 | Mueller et al. | 525/479 |
| 4,182,723 | 1/1980 | Covington | 525/479 |

*Primary Examiner*—Lorenzo B. Hayes
*Attorney, Agent, or Firm*—Weingram & Klauber

[57] ABSTRACT

A composition which is hydrophobic but possesses excellent wettability comprising copolymers and terpolymers of a polysiloxane and esters of acrylic and methacrylic acids. These compositions are suitable for use as ocular membranes worn in contact with the eye which possess excellent oxygen permeability, light transmission, wettability, mucophobicity, and lipophobicity and which can be worn for extremely long periods of time and then disposed of.

A method of preparing the ocular membranes is disclosed, in which the composition is placed between disposable molds and cured therein. The cured, mechanically and optically finished ocular membrances are recovered by the destruction of said molds and without secondary operations.

The ocular membrane is a flexible, oxygen-permeable, membrane, adapted to be inserted on the eye and worn thereon continuously for extended periods.

18 Claims, 13 Drawing Figures

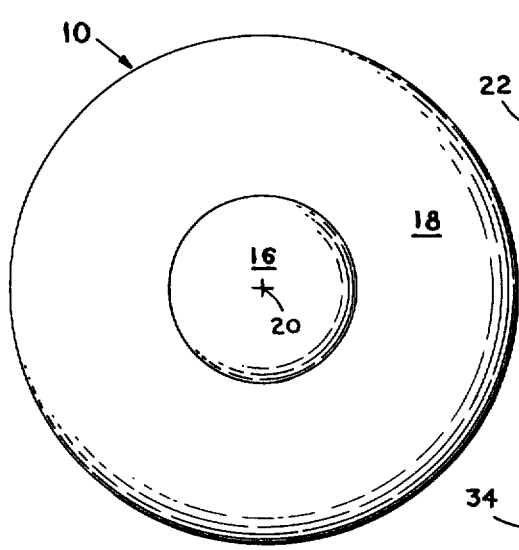
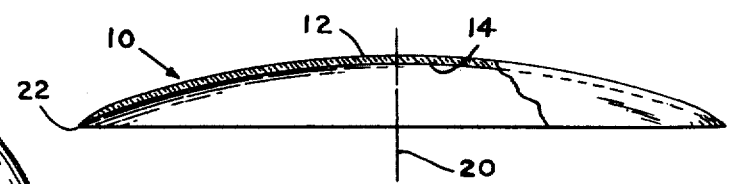
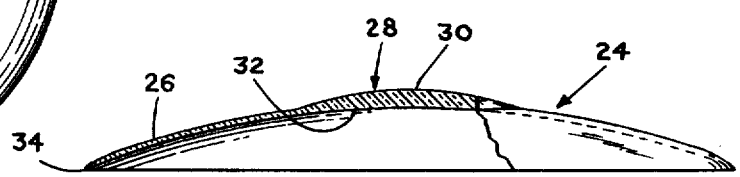
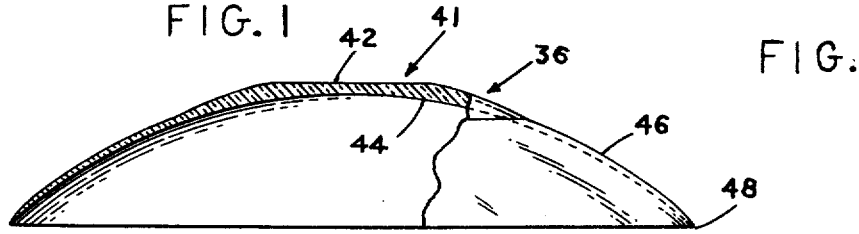
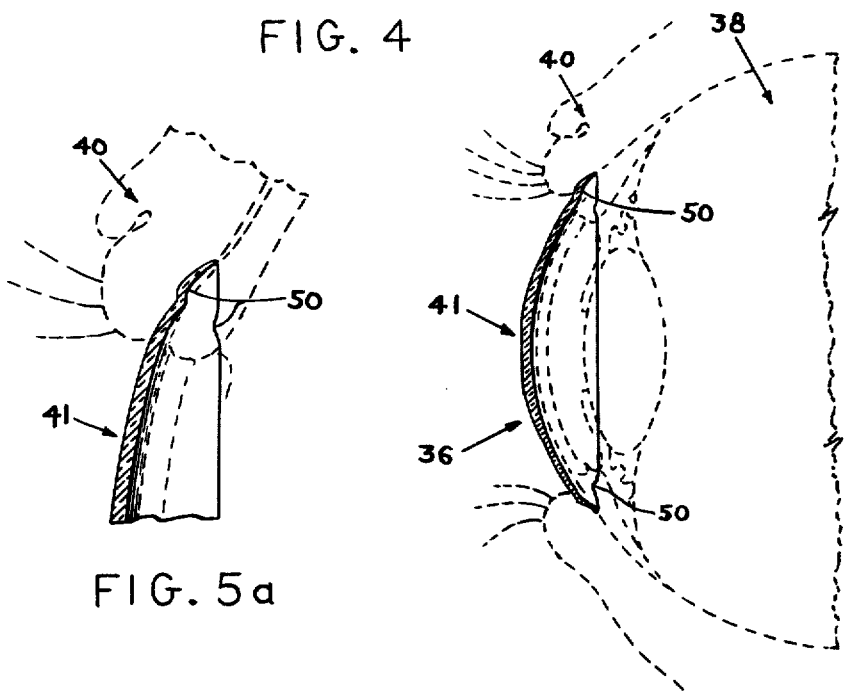

POLYSILOXANE COMPOSITION

RELATIONSHIP TO RELATED APPLICATION

This is a continuation-in-part of my copending application, Ser. No. 677,246 filed Apr. 15, 1976 now U.S. Pat. No. 4,169,119 issued 9-25-79, the contents of which are incorporated herein by reference.

BACKGROUND OF THE INVENTION

1. Field of the Invention

This invention relates to the field of polymeric compositions suitable for use in forming contact lenses. More particularly, the invention concerns a disposable, thin membrane formed for ocular and other therapeutic use from the aforementioned composition, which membranes can be worn for long periods of time without discomfort; the method of making such a membrane, and the membrane itself.

2. Description of the Prior Art

Optical contact lenses are conventionally made of either hard plastic, such as, acrylic resins or materials which are hydrophilic and water swellable (the so-called "soft lens"). The resins utlized conventionally must, of course, possess the various properties required for the ophthalmic use with respect to their light transmission, durability, etc. However, all of the known lenses present the basic defect that they cannot be worn regularly in the eye for a long periods of time, i.e. for more than about fourteen to eighteen hours. Most certainly, their use is not recommended during sleep. Consequently, the contact lenses known to date should be inserted and removed daily from the eye.

Furthermore, those "hard" lenses made from the polymethylmethacrylate resins possess excellent rigidity and durability for handling by the user. However, they are highly impermeable to oxygen and carbon dioxide which is necessary for the proper metabolic functioning of the eye. These resins are also hydrophobic and as a result lack surface wettability.

The so-called "soft" lenses, which are water swellable and hydrophilic must be maintained under conditions of sterility. This results in various inconveniences to the user.

Moreover, the "soft lenses" which are made from water swellable, hydrophilic polymers do not have the durability of the "hard" acrylic resin materials and are much more difficult to handle. Further, they are water swellable and can absorb an amount of water which is equal to many times the original volume of the lens. Consequently, the dimensions of such lenses are constantly undergoing change, which, in turn, changes the refractive index, and the refractive or ophthalmic properties of the lens.

Also, when such lenses are manufactured in the dry, unswollen state, the ultimate dimensions of the lens can vary greatly because minor deviations from standards will be amplified many times when the lens fully swells. Therefore, the "soft" lenses are relatively difficult to manufacture to the exacting tolerances required, as is repetitive, production or duplication of lenses of the same refraction and curvative parameters.

An additional problem with such contact lenses arises due to the fact that the cornea, on which the lens rests or covers, must have an adequate supply of oxygen, much of which is supplied by the tear fluid which bathes the cornea. This, oxygen, presumably from the atmosphere, dissolves in the tear fluid and it is this dissolved oxygen which is then transferred to the cornea.

The so-called "soft lenses" like their "hard" counterparts, do not possess satisfactory permeability to oxygen and consequently offer no solution to this problem.

Attempts have been made to use a polysiloxane gum as a contact lens because of its high permeability to oxygen. See, for example U.S. Pat. No. 3,228,741. However, this particular material is quite hydrophobic. In order to assure proper comfort and wearability in a contact lens or material that is in direct contact with the eye, it is important that the material be wettable, i.e., so that the tear fluid will form a continuous film on the lens and not bead up. In use, this film is renewed at each eyelid blink so that, as a practical matter, the material must have sufficient wettability to allow formation of a continuous film of tear liquid which film will last for the duration of the blink period.

The cross linked polysiloxanes do not possess this property and have thus found little use in the contact lens field.

Another problem with the siloxane materials is that, when placed in the eye, the surfaces of the lens attract ocular debris, e.g., proteins, lipids, mucoids, and the like, which the eye is constantly giving off. One of the functions of the tear liquid is to wash away this debris. However, the polysiloxane material is lipophilic and mucophilic, i.e., attracts this ocular debris, and this further restricts the siloxane material of opthamalmic use.

Attempts have also been made to modify such polysiloxanes by grafting, i.e., coating the surface thereof with another type of polymer. Such attmepts have been generally unsuccessful because of the difficult techniques involved in obtaining lenses and optically acceptable membranes from such nonuniform systems.

In my related applicaton Ser. No. 677,246, I disclosed a new polysiloxane copolymer composition which possesses a number of properties which makes it highly suitable for use as an ocular lens, among which are excellent wettability and oxygen permeability.

Additionally, the composition disclosed herein allows for the accurate reproduction of tolerances and lens parameters.

SUMMARY OF THE INVENTION

I have discovered a polymeric composition which is suitable for making an ocular membrane which possesses excellent optical properties and excellent permeability to oxygen and carbon dioxide. The material is hydrophobic; in otherwords, essentially non-water swellable. However, the surface of the material is highly wettable, i.e., allows a continuous tear liquid film to be formed and maintained during the normal blink period.

Additionally, the polymer of the present invention possesses all of the desirable properties of the composition disclosed in the above mentioned related application.

As a result of all these properties, this material can be used to make thin ocular membranes which, after initial insertion in the eye, can be worn for extended periods, for example, for several days to several months, and need not be removed daily from the eye.

Also, the membrane made from the present invention can be used as an ocular bandage or therapeutic device.

Specifically, the composition of the present invention is composed of uniform polymer which are copolymers or terpolymers or of a polysiloxane cross linked by addition polymerization and one or more, in the case of the terpolymer, esters having the formula:

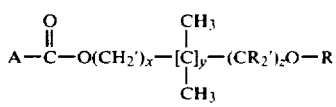

wherein:
A is $CH_2=CH-$ or

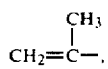

R' may be the same or different in each occurence and may be hydrogen or methyl, R is hydrogen, lower alkyl having one to three carbon atoms,

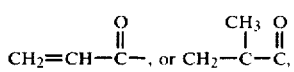

x and z are integers from 0 to 4,
y is 0 or 1,
the sum of x and z is one or more, and when y is 1, x and z are equal.

By uniform, it is meant that the entire composition, and more particularly, ocular membranes made from the composition are chemically homogenous and not composed of layers or coatings of one type of polymer on the surface of another polymer.

The amount of the total ester in the polymer is that amount which is sufficient to impart wettability to the surface of articles formed from the polymer but which is below that amount which would make the polymeric material water swellable. As used herein, the term "wettability" means that the surface of the material should have the ability to allow the formation of a continuous film of tear liquid across the surface of the material and the maintenance of the film, without intermittent beading up, for the normal period of the blink cycle. In this regard, it is noted that this particular property is best determined from empirical measurements on the eye of humans. In practice, of the material wets too poorly for use as a lens or therapeutic ophthalmic device, e.g., a bandage, it will be immediately evident to the clinical observer. The material is "water swellable" if it absorbs more than about 10% by weight of water.

Ocular membranes made from this composition are highly permeable to oxygen and carbon dioxide, which are necessary for proper metabolic functioning of the eye. The lens material is inert and non-toxic and completely compatible with the natural precorneal fluid. It also possesses excellent stability with respect to the index of refraction and light transmission on the eye and thus does not cause variations in visual acuity.

Of significant importance is that the polymeric composition of the present invention, while possessing the desirable properties of the polysiloxane, namely, the higher oxygen and carbon dioxide permeability, also avoids the mucophilicity and lipophilicity of the polysiloxane. Thus, lenses and bandages composed of the present material stay clean and free of ocular protein debris for extended periods of time while worn on the eye.

Because of the complete interfacing of the cured membrane and the mold surfaces as described herein, freeing of the cured membrane from the mold surfaces without damage to the cured membrane is best accomplished by destruction of the mold surfaces by a method as described herein, although other methods of removal can be used. What is important, however, is that the process of the present invention allows for the exact replication of lens parameters which is difficult or impossible to obtain with the "soft lenses". Further, the membranes of the present invention can be produced in final form in closed molds wihout being encumbered by flashings or the need for edging.

The ocular membrane of the present invention can be prepared by introducing the uncured composition of the above-noted polymer into an ophthalmically contoured mold chamber fromed from concave and convex mold members. The mold members form a substantially closed mold chamber. The mold members are formed from a material which is highly soluble in a given solvent, which solvent is a non-solvent for the cured membrane polymer. Then the composition in the mold chamber is subjected to curing conditions.

In another approach, the mold members may be formed of a material which melts at a temperature which is non-injurious to the cured membrane polymer.

Alternately, the mold members may be made from a material which may be destroyed by acid, base or reagents which are non-injurious to the cured membrane polymer.

BRIEF DESCRIPTION OF THE DRAWING

FIG. 1 is a top plan view of an ocular membrane made in accordance with the present invention.

The FIGS. 2-4 are cross-sectional views of ocular membrances made in accordance with the present invention.

FIG. 5 shows an ocular membrance made in accordance with the present invention in position when operatively placed on the human eye.

FIG. 5a is an enlarged view of a portion of FIG. 5.

Figure 6:
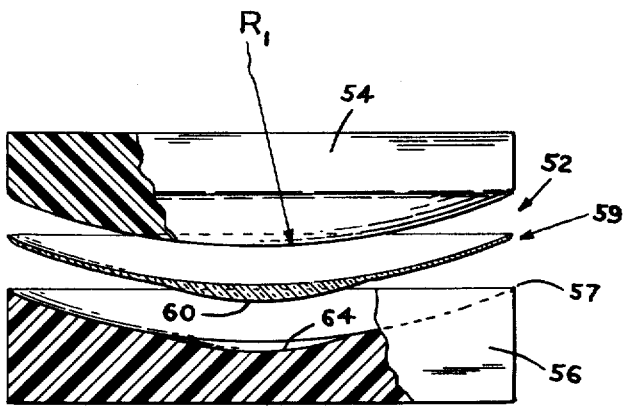

FIG. 6 shows the cured ocular membrane in relation to the mold surfaces used in its formation.

Figure 7:
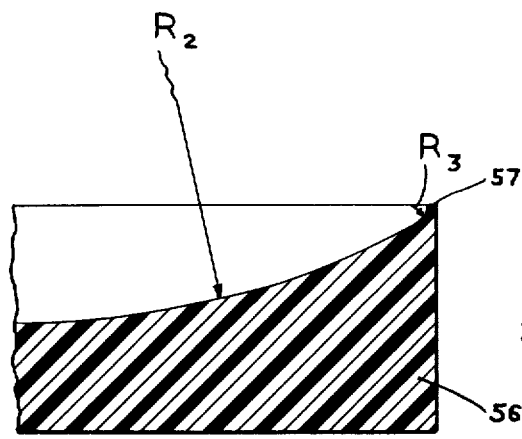

FIG. 7 is an enlarged view of a portion of the mold shown in FIG. 6.

Figure 8:
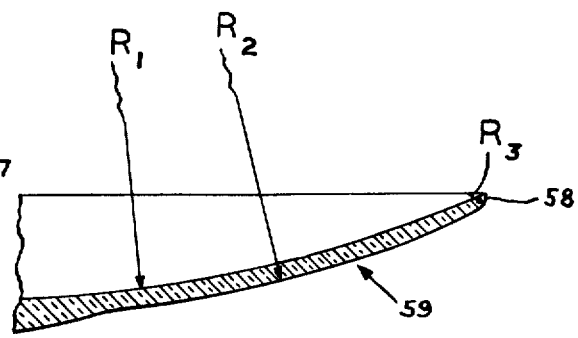

FIG. 8 is an enlarged view of a portion of the ocular membrane shown in FIG. 6.

FIGS. 9-12 depict sequential steps in the process of the present invention.

DESCRIPTION OF THE PREFERRED EMBODIMENT

The first component of the composition of the present invention is a cross linkable "flexible silicon resin" which because of availability, is usually a dimethylpolysiloxane polymer. Such dimethylpolysiloxanes are well known in the art and methods for preparation of such materials are well known. Typical siloxane polymers and methods for their preparation are described in detail in U.S. Pat. No. 2,560,498, the contents of which are incorporated herein by reference.

A typical polysiloxane which can be used in the present invention is dimethylpolysiloxane wherein up to about one percent of the methyl groups are substituted with vinyl groups. To cross link the dimethylpolysiloxane, polymethylhydrogen siloxane can be used wherein one of the methyl groups of the dimethylpolysiloxane is substituted with a hydrogen. Each of these polymers is well known and commercially available.

The molecualr weight or viscosity of the polysiloxane is not critical. Of course, the viscosity of the polysiloxane must be such that it forms a pourable liquid suitable for introduction to the mold members as hereinafter described for preparation of the ocular membrane.

As is known, dimethyl polysiloxanes can be cured or cross-linked by either condensation or addition polymerization. However, in the present case, addition polymerization is used since the water which is produced with condensation polymerization causes non-uniformities in the final polymer due to the escape of the water from the reaction. Also, the water which doesn't escape results in the formation of bubbles or voids in the final product. The presence of this water renders the light transmission of the final composition unsuitable for ocular use.

Typical addition cross-linking polymerizations are disclosed in U.S. Pat. No. 2,970,150, incorporated herein by reference. It is also well known to include fillers such as silica and the like in such polysiloxane materials; and their use in the present composition is suitable so long as the fillers do not interfere with the desired properties of the final membrane. Typically, for example, from 0 to 50% by weight of fine powdered silica can be used for reinforcement of the polysiloxane.

Such polysiloxanes are cross linked to form elastomers by the use of a suitable cross linking catalyst which catalysts are also well known. See, for example, U.S. Pat. No. 2,823,218, the contents of which are incorporated herein by reference. A typical catalyst is chlorplantinic acid, although many other perfectly satisfactory cross linking catalysts are known to the skilled artisan and are readily available commercially.

The addition cross linked elastomers formed from the resin systems are extremely hydrophobic. Thus, they are not suitable for use as a contact lens, although they possess the transparency, mechanical strength, durability and dimensional stability required.

Consequently, in the present invention, the resin is copolymerized with one or more esters having the above noted formula. The total amount of the ester which is used in the final elastomeric polymer is that amount which is effective to impart wettability to the surface of articles formed therefrom, namely, an ocular membrane, but in an amount less than that which would make the composition water swellable.

The esters which can be used to form the copolymer or terpolymer of the present invention in conjunction with the polysiloxane are those formed from the reaction of acrylic or methacrylic acid and be appropriated straight chained or branched alcohols. Methods for carrying out the esterification reaction are well known in the art, see for example, F. W. Billmeyer *Texbook of Polymer Science*, Interscience Publisher, 5th Ed., 1970, pp. 403, and such esters are available commercially. Also see Morrison & Boyd, *Organic Chemistry*, Allyn & Bacon, Inc., First Ed., pages 152, 153, and 650–675.

These esters may be either the mono or diesters of the acrylic acids and have the formula I as set forth herein alone. Esters, there precursor alcohols and respective structural formulas which are particularly suitable for use in the present invention are as follows:

TABLE 1

| PRECURSOR ALCOHOL | ESTER NO. | ESTER(mono or diester with acrylic or methacrylic acid) |
|---|---|---|
| PROPYLENE GLYCOL (1,2 Propanediol)<br>$CH_3HOHCH_2OH$ | 1 | 2-HYDROXY PROPYL METHACRYLATE<br>(Propylene Glycol mono methacrylate)<br>$CH_2=\underset{\underset{CH_3}{\mid}}{C}\overset{\overset{O}{\parallel}}{C}OC\underset{\underset{CH_3}{\mid}}{H}CH_2OH$ |
| BUTYLENE GLYCOL<br>$HOCH_2CH_2CH_2CH_2OH$ | 2 | 1,4, BUTYLENE GLYCOL MONOMETHACRYLATE<br>$CH_2=\underset{\underset{CH_3}{\mid}}{C}\overset{\overset{O}{\parallel}}{C}-OCH_2CH_2CH_2CH_2OH$ |
| HEXAMETHYLENE GLYCOL (1, 6 Hexanediol)<br>$HOCH_2CH_2CH_2CH_2CH_2CH_2OH$ | 3 | HEXAMETHYLENE GLYCOL DIACRYLATE<br>$CH_2=CH\overset{\overset{O}{\parallel}}{C}OCH_2CH_2CH_2CH_2CH_2CH_2O\overset{\overset{O}{\parallel}}{C}CH=CH_2$ |
| HEXAMETHYLENE GLYCOL (1, 6 Hexanediol)<br>$HO[CH_2]_6OH$ | 4 | HEXAMETHYLENE GLYCOL DIMETHACRYLATE<br>$CH_2=\underset{\underset{CH_3}{\mid}}{C}\overset{\overset{O}{\parallel}}{C}OCH_2CH_2CH_2CH_2CH_2CH_2O\overset{\overset{O}{\parallel}}{C}\underset{\underset{CH_3}{\mid}}{C}=CH_2$ |
| ETHYLENE GLYCOL MONOMETHYL ETHER (2-METHOXY ETHANOL)<br>$CH_3OCH_2CH_2OH$ | 5 | 2-METHOXY ETHYL METHACRYLATE<br>$CH_2=\underset{\underset{CH_3}{\mid}}{C}\overset{\overset{O}{\parallel}}{C}OCH_2CH_2OCH_3$ |
| ETHYLENE GLYCOL MONOMETHYL ETHER (2-METHOXY ETHANOL)<br>$CH_3OCH_2CH_2OH$ | 6 | 2-METHOXY ETHYL ACRYLATE<br>$CH_2=CH\overset{\overset{O}{\parallel}}{C}OCH_2CH_2OCH_3$ |
| TETRAMETHYLENE GLYCOL (1, 4 Butanediol)<br>$CH_2OHCH_2CH_2CH_2OH$ | 7 | TETRAMETHYLENE GLYCOL DIACRYLATE<br>$CH_2=CH\overset{\overset{O}{\parallel}}{C}OCH_2CH_2CH_2CH_2O\overset{\overset{O}{\parallel}}{C}CH=CH_2$ |
| TETRAMETHYLENE GLYCOL (1, 4 Butanediol) | 8 | TETRAMETHYLENE GLYCOL DIMETHACRYLATE |

TABLE 1-continued

| PRECURSOR ALCOHOL | ESTER NO. | ESTER(mono or diester with acrylic or methacrylic acid) |
|---|---|---|
| $CH_2OHCH_2CH_2CH_2OH$ | | $CH_2=\overset{O}{\overset{\|}{C}}COCH_2CH_2CH_2CH_2O\overset{O}{\overset{\|}{C}}C=CH_2$<br>$\quad\quad\|\quad\quad\quad\quad\quad\quad\quad\quad\|$<br>$\quad CH_3\quad\quad\quad\quad\quad\quad\quad CH_3$ |
| NEOPENTYL GLYCOL (2, 2 Dimethyl, 1, 3 Propanediol)<br>$HOCH_2C(CH_3)_2CCH_2OH$ | 9 | NEOPENTYL GLYCOL DIACRYLATE<br>$CH_2=CHC-OCH_2CCH_2O-CCH=CH_2$<br>with $CH_3$ groups |
| NEOPENTYL GLYCOL (2, 2 Dimethyl, 1, 3 Propanediol)<br>$\quad\quad CH_3$<br>$\quad\quad\quad\|$<br>$HOCH_2-C-CH_2OH$<br>$\quad\quad\quad\|$<br>$\quad\quad CH_3$ | 10 | NEOPENTYL GLYCOL DIMETHACRYLATE<br>$CH_2=\overset{O}{\overset{\|}{C}}COCH_2\overset{CH_3}{\overset{\|}{C}}CH_2O\overset{O}{\overset{\|}{C}}C=CH_2$<br>$\quad\|\quad\quad\|\quad\quad\|$<br>$CH_3\quad CH_3\quad CH_3$ |

The above noted esters may be used singularly as the ester component of the copolymer of the present invention. Additionally, any two of these esters may be used as the two ester components of the terpolymers of the present invention.

Particularly preferred esters for the copolymer and terpolymer combinations are:

(a) 2-methoxyethlyacrylate;
(b) propylene glycol monomethacrylate and tetramethylene glycol dicrylate (terpolymer);
(c) hexamethylene glycol diacrylate;
(d) propylene gycol monomethacrylate;
(e) neopentyl glycol dimethacrylate; and
(f) 1,4 butylene glycol monomethacrylate.

Of course, it is noted that the esters may be used interchangeably to vary the desired properties of the final composition or to facilitate processing.

More particularly, any one of the individual esters may be polymerized with the polysiloxane to form a copolymer in accordance wih the present invention. The amount of such ester generally ranges from about 0.2 to 5.0 percent by weight of the total polymer. However, the specific amount of ester used is determined by the ultimate properties desired, i.e., light transmission, wettability, etc.

Alternately, two of the esters may be polymerized with the polysiloxane to form a terpolymer. In this case, the amount of the individual esters may also be varied to modify the properties as desired. Again, however, the total amount of the esters in the terpolymer will range between about 0.2 and 5 percent by weight. With these materials, one can achieve varying degrees of surface wettability, lipo- and muco-phobicity, and transparency, depending on the final values for these properties which are required in the end product.

As noted herein, the term "wettability" means that the surface of optical membranes or contact lenses formed from the composition wet sufficiently so as to maintain uninterrupted refractive functioning. The "wettability" of membranes in accordance with the present invention is difficult to quantify because the wettability properties which are required, must be present when the membrane is in contact with the eye and the conditions present in this environment cannot be practicably duplicated for purposes of laboratory measurement. Fortunately, however, the "wettability" can be easily determined from empirical clinical observation.

Attempts have been made to simulate the in vivo environment under which contact lenses function so as to measure the so-called "contact angle" of the surface of a given material and thus evaluate its potential performance. The most recent evaluative procedure is reported in *International Contact Lens Clinic,* Volume 5, No. 1, January-February, 1978, in an article entitled "Measuring the Contact Lens Wetting Angle in a Simulated in vivo Environment." (Herein referred to as the "in vivo" method.) As measured by this method, the composition of the present invention in the fully hydrated state exhibits contact angles in the range from about 0° to 30°, with a mean value of about 18°.

At the same time, however, the composition must not be rendered so hydrophilic as to absorb significant amounts of water, i.e., more than 10% by weight. As noted hereinabove, this is one of the basic disadvantages of the so-called "soft lens" now in use. As used herein, the expression "hydrophilic" means that the composition does absorb significant amounts of water.

The phenomenon of such hydrophilicity or swellability is to be distinguished from the property of "water permeability" the latter property being possessed by the present compositions. The term "water permeability" as used herein means that the present compositions permit water to pass through the membrane without any appreciable retention of the water within the composition. This property is considered to be important for the metabolic function of the cornea and particularly appears to have an effect on the corneal temperatures which are normally elevated by contact lens use.

It is clear that the skilled artisan can determine the exact balance of wettability, permeability, hydropobic, mucophobic and lipophobic properties required for the specific ocular membrane being contemplated.

In a specific embodiment, the composition of the present invention may be formed by first preparing a mixture of dimethylpolysiloxane and a catalyst with an appropriate silicon hydride, e.g., methylhydrogenpolysiloxane, with the catalyst. A mixture of the ester or esters with an appropriate free radical source, such as, a peroxide or an azo compound, conventionally used for such purposes, is then admixed into the silicon resin mixture. This mixing generally is carried out at a room temperature and atmospheric pressure.

Thereafter, the composition is placed in an appropriate opthalmic mold, as described hereinafter, and the final mixture is subjected to polymerization conditions to form the desired copolymeric or terpolymeric product. Typically, such polymerization conditions are from about 40° to 90° C. and preferably from about 65° to 85° C. for a time period varying from about 30 minutes to twelve hours, and especially from about four to eight hours.

The mixture may also be postcured. Such postcuring may or may not be carried out if desired depending on the final properties required and the specific components used. Generally, postcuring is carried out at a temperature from about 100° C. to 150° C. and, preferably, from about 120° C. to 140° C. for a time period varying from about one to six hours. Such postcuring is generally desirable to eliminate any traces of the free radical source as well as to insure complete cross linking of the composition.

In a preferred method of preparation, the ester compound includes 2-hydroxypropylmethacrylate (sometimes called herein propylene glycol monomethacrylate) which is first prepolymerized, either alone or mixed with another ester if a terpolymer is to be prepared, in the presence of a catalyst, e.g., azobis isobutyronitrile, in an amount, such as, about 0.1% by weight, at a temperature of less than about 9°/C. for less than about 60 minutes. This may be further mixed with water up to 20% by weight of the 2-hydroxypropyl methacrylate. This prepolymer may then be added to the polysiloxane and mixed for about 10 minutes or less. An appropriate amount of the hydrogen siloxane needed for the cross linking along with a chlorplatinic acid derivative catalyst are then added to complete the casting mixture.

More particularly, the copolymeric composition is prepared by mixing about 0.01 to 0.06 parts by weight, preferably from about 0.02 to 0.05 parts by weight, of an appropriate free radical source with from about 0.3 to 3.0 parts by weight (based on the final weight of the elastomer to be prepared) and preferably, from about 0.5 to 2.0 parts by weight of the appropriate ester.

The free radical sources are generally peroxides, since they are most readily available. The specific free radical source used is not critical, so long as it effectively produces a source of the desired free radicals. A preferred source is one which would be effective at a moderate temperature of about 50° to 90° C. Typically, organic peroxides, such as, benzoyl peroxide, acetyl peroxide, lauroyl peroxide, decanoyl peroxide, capryl peroxide, and the like can be used.

The mixing of the ester and the peroxide is carried out by agitation and is not particularly critical. As noted, the mixing of the ester and the peroxide may generally be carried out at about room temperature.

An appropriate polysiloxane mixture is then prepared, for example, by adding about one to twenty-five parts by weight and, preferably, about five to twenty parts by weight of methylhydrogenpolysiloxane to about one hundred parts by weight of the resin, i.e., the dimethylpolysiloxane.

This mixing can also be carried out at about room temperature and the speed of mixing is not particularly critical.

The first and second mixtures are then added to one another and mixed by agitation. This final mixture may then be degassed by applying a vacuum to remove any air bubbles.

If desired, prior to subjecting the mixture to the final polymerization conditions, one could add conventional additives in the art, such as, for example, pigments and the like. Typical pigments used in the optical art include organic pigments, such as, dioxazione, napthol, aluminum lakes, and various inorganic pigments, such as, titanium dioxide, hydrated chrome, ultramarine blue, and the like. Obviously, any coloring pigments utilized must be non-toxic and must remain stable in the presence of the oxidizing agent utilized in the polymerization. Typically, for example, about 0.0001 to 0.01 parts by weight of a pigment will be used, depending upon the desired depth and shade of the color.

Also, as noted, known reinforcing fillers, e.g., fine silica, may be used in the present composition in amounts which do not detrimentally affect the desired properties. From about 1% to 50% by weight of such filler, based on the weight of the polysiloxane, may be used, and preferably about 2% to 9% of such filler.

The finished polymer does not retain more than about 10% by weight of water. However, its surface possesses adequate wettability so as to provide a continuous tear or aqueous film in the manner as discussed herein. Moreover, the composition exhibits lipophobic and mucophobic properties as well as an ability to resist dust collection.

Additionally, this final polymer is highly permeable to oxygen and carbon dioxide, but is inert, non-toxic and completely compatible with the human eye. Moreover, being hydrophobic, it does not swell with water and can be made to conform closely and naturally to the most intricate ocular topography. It possesses a stable index of refraction under all required conditions and is durable, flexible and transparent. Moreover, it does not support bacterial growth and is ideally suited for making the disposable ocular membranes of the present invention.

Referring to the drawing, FIG. 1 shows a plan view of an ocular membrane formed from the composition of the present invention, while FIGS. 2, 3 and 4 show cross-sectional views of ocular membranes formed from the composition of the present invention. Of course, the specific shape of the membrane itself will depend upon the specific opthalmic prescription required.

FIGS. 1 and 2 show a planor membrane generally indicated at 10 having an anterior surface 12 and a posterior disposed with the extrapupillary zone 18 about the central axis 20 of the membrane. The anterior surface meets the posterior surface at the edge 22 of the membrane in a manner to be more fully described below.

FIG. 3 shows a plus membrane generally indicated at 24 having an extrapupillary section 26 with a pupillary section 28 of a converging miniscus type, having an anterior surface 30 of the pupillary zone with a shorter radius of curvature than the posterior surface of the pupillary zone 32. The edge of the membrane 34 is formed in the same manner as that of the membrane shown in FIG. 2 and FIG. 4 to be described below.

FIGS. 4 and 5 show a minus power membrane generally indicated at 36 positioned on a human eye generally indicated at 38 partially beneath the eyelid 40. The pupillary zone 41 of membrane 36 is a minus powered miniscus consisting of an anterior surface 42 having a larger radius of curvature than the posterior pupillary surface 44.

The extrapupillary zone 46 of the membrane 36 terminates at an edge 48 which is formed by the intersecting edge curve on the anterior periphery of the membrane which intersects with the uniformly curved extrapupillary surface of the posterior surface.

The edges of the other ocular membranes also terminate in this manner which is most clearly shown in FIG. 8, where the intersecting curve designated R3 is formed on the anterior periphery of the ocular membrane having a radius of curvature $R_2$ and $R_3$ intersects the uniformly curved extrapupillary posterior surface having radius of curvature $R_1$.

The important aspect of an ocular membrane of the present invention insofar as its physical form is concerned is the fact that it can be made extremely thin. Because of this thinness and the resultant lightness and permeability of the material to oxygen and carbon dioxide, the membrane may simply be placed on the eye in the usual manner and may be retained there for a number of days, weeks and even months without adverse effects of the eye. Additionally, the thinness of the membrane coupled with the elasticity of the composition makes the membrane extremely flexible so that it is deformable by pressure of the eye lid during the normal blinking cycle. This deformation enhances circulation of the precorneal fluid further improving the metabolic compatibility of the membrane with the eye. Of course, the period of time that a given ocular membrane can be worn will depend to a great extent on the wearer and the ophthalmic prescription involved. However, it is clear that the ocular membrane of the present invention for any given wearer, can be worn for significantly greater periods than the conventional contact lenses presently known.

As seen near the periphery of membrane 36, a wrinkle or local temporary deformation 50 is produced during the blinking cycle. This wrinkle which can be compared to a wave effect on the extrapupillary surface. The wrinkle literally produces a pumping action circulating corneal liquid from beyond the periphery of the membrane to and from under the membrane in order to enhance the metabolic compatibility of the membrane with the eye.

Additionally, because the extrapupillary zone of the membrane is so thin, deformation produced by the blinking process is restricted to the extrapupillary section and does not in any way produce dedormations in the pupillary zone of the membrane which would result in visual distortions to the wearer of the membrane. This is made possible because the relative thinness of the extrapupillary section produces a relatively greater flexibility in the extrapupillary section than in the pupillary section of the membrane.

The present composition, after curing, has a light transmission as required for optical use, i.e., as measured by spectrophotometer of better than eight-five percent on a one mil thick sample, although for certain uses, light transmissions as low as 80 percent might be allowable.

The ocular membrane of the present invention is prepared by first forming a lens mold cavity composed of two mold members, a concave member and a convex member. The convex member is a replica of the ocular surface with a small pupillary segment conforming in its geometry to the topography of the human cornea. Of course, the pupillary segment in the concave member of the mold would conform to the specifications of the ophthalmic prescription.

The mold members are made from plastic materials which are soluble in solvents in which the lens copolymer is not soluble. Examples of suitable materials which can be used as the mold members include, but are not limited to, polymethylmethacrylate, ethyl cellulose, cellulose acetate, polystyrene, vinyl acetate, epoxy, methyl cellulose acetate, acrylic butadiene styrene copolymer and caranuba wax.

A die for forming the mold members is first made. It can be made from a calcium sulphate impression which, utilizing conventional methods, is formed by making an impression of the human eye or, alternatively, an impression of a life-size model of the human eye. The die is generally made of a metal, e.g., steel, chrome, or nickel.

An impression may be made of the entire sclera and cornea; a part of the sclera and all of the cornea; or alternatively, only of the cornea itself, in whole or in part. Whichever impression is made, it is, of course, ultimately transferred to the final ocular membrane. Thus, depending upon the particular prescription, the ocular membrane made according to the present process will cover either the entire sclera and all of the cornea, or only part of the sclera and all of the cornea, or only cover the cornea, in whole or in part. The convex mold possesses a configuration identical to the concave mold with the exception of a central pupillary area which possesses geometry and dimensions as dictated by the specific refractive ophthalmic prescription being used. In addition, the concave mold is so shaped so as to permit it and the convex mold to meet uniformly over the entire perimeter of the two molds when brought together.

The thermoplastic molds are made by conventional casting, injection molding, or compression molding methods utilizing metallic master dies, as previously mentioned. They may be formed from calcium sulphate impressions of the eye or, alternatively, machined to duplicate standardized models of the human eye topography over the entire range thereof. This procedure permits perfect duplication of either unique models or standard models of ocular topography through the use of various plastic materials.

The relationship of the molds and membrane is shown in FIG. 6, and the process by which the molds are used to form the membrane is shown in FIGS. 9 through 12.

In FIG. 6, the mold assembly generally indicated at 52 has a convex mold 54 positioned above a concave mold 56. The concave mold 56 has a central pupillary portion 64 and has a raised circumferential annular surface 57 of radius $R_3$ as shown in FIG. 7, which forms an edge on the membrane generally indicated at 59 by intersecting with the radius of curvature $R_1$ of the convex mold surface 54 because the circumferential annular surface 57 has a steeper radius of curvature than does the radius of curvature of the convex mold surface.

The membrane 59 is shown positioned between the upper convex mold 54 and the lower concave mold 56. The alignment of the upper or the convex mold 54 with the concave mold 56 is determined by means of the circumferential annular surface 57 or $R_3$ on the lower mold which coacts with the radius of curvature $R_1$ on the convex surface of the upper mold. The difference in the radii of curvature between the circumferential annular surface $R_3$ and the radius of curvature $R_1$ of the convex mold surface 54 produces the peripheral edge 58 of membrane 59. The pupillary section of the lens 60 will be accurately positioned with relation to the peripheral edges of the membrane as long as the upper and lower mold sections are in parallel and perpendicular alignment. This is accomplished in a manner well known in the art in which the lower mold member is allowed to slide freely on a horizontal plane so that it will automatically position itself when the upper mold member engages it.

Figure 9:
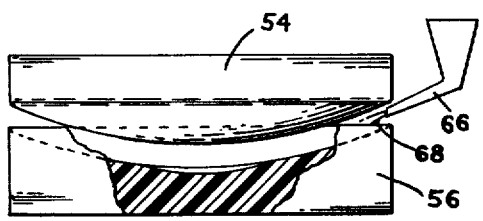
Figure 10:
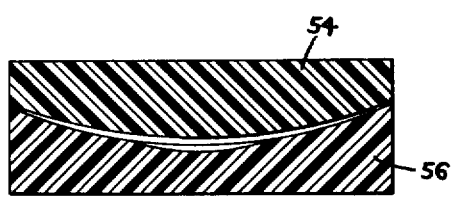

As shown in FIG. 9, the first step in the formation of the ocular membrane is to properly position the convex and concave molds 54 and 56 respectively in vertical and horizontal alignment. Then, the copolymer liquid 68 preprared as described hereinabove is poured from a pouring spout 66 to fill the concave mold to a level sufficient to take up the entire volume that will form the membrane. The upper mold 54 is then lowered onto the lower mold to engage the lower mold and thereby to form a substantially closed mold chamber and, in the process, will expel any excess copolymer liquid which has been deposited in the lower mold.

The mold halves are then left in their engaged position for a period of time sufficient for cross linking to take place. Once this has occurred, because of the relative thinness of the ocular membrane and its intimate contact with the mold surfaces, it would be difficult if not impossible to separate the mold surfaces and remove the ocular membrane without in some way impairing the optical finish of the finished membrane.

Of course, in view of the fact that the process of the present invention provides a membrane which, after curing, requires no further treatment in terms of finishing of edges, removal of any end portions present due to unsealed portions of molds, and the like. From an economic point of view, this is a very important aspect of the invention since the requirements normally associated with finishing ophthalmic devices, membranes, bandages, and lenses are a significant factor in determining the ultimate cost to the user.

Figure 11:
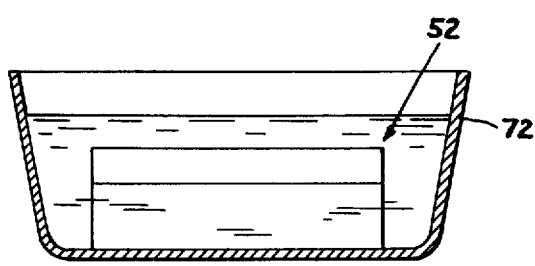
Figure 12:
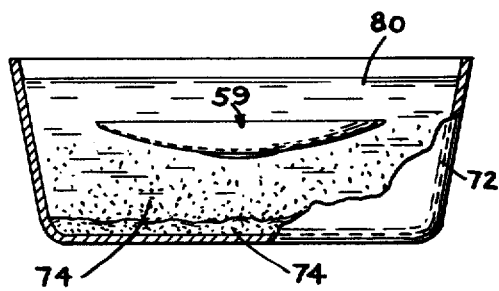

Therefore, it is preferable, in order to avoid this step of removing the membrane from the mold surfaces, to remove the mold from the membrane by a destruction process in which the material from which the mold is fabricated is placed in contact with another material which is incompatible with the survival of the mold material but which is incompatible with the survival of the mold material but which will have not permanent effect on the material forming the ocular membrane. This process is shown in FIGS. 11 and 12, where the mold assembly, generally indicated at 52 is positioned in a vessel 72 filled with, for example, one of the solvents in which the mold material would dissolve but which would not in any way absorb or attack the material from which the ocular membrane is produced. After a sufficient period of time, the mold will be reduced to debris 74 shown in FIG. 12 and the membrane 57 will itself float freely in the liquid. Of course, the membrane can also be removed by manual techniques.

After the membrane has floated free, it can then be removed, washed and dried and further postcuring can be accomplished if desired. Washing is generally done in a sodium chloride solution (three percent is preferred).

It should be noted that the membrane, once released from the mold, is in the finished state and that no further forming process is necessary in order to produce any optical properties of the membrane or any edge, shape or configuration on the lens.

In accordance with one embodiment of the present invention, the removal of the cured ocular membrane from the mold members is accomplished by inserting or submerging the entire assembly into a solvent for the mold members. As noted hereinabove, this solvent should be a non-solvent for the cured contact lens or ocular membrane composition but should be a good solvent for the mold material.

The following table sets forth a number of suitable plastic materials which can be used to make the mold and solvents which can be used in conjunction with them.

| Mold Material | Solvent |
|---|---|
| polymethyl methacrylate | acetone |
| polyacrylic resin (soluble) | isopropanol |
| ethyl cellulose | ethyl alcohol |
| cellulose acetate | methyl ethyl ketone |
| polystyrene | toluene |
| vinyl acetate | methyl alcohol |
| epoxy | isophorone |
| methyl cellulose acetate | water |
| acrylo butadiene styrene | methyl ethyl ketone |
| caranuba wax | benzene |

The minimal thickness of the ocular membrane of the present invention adds to its permeability to oxygen and carbon dioxide, thereby allowing proper metabolic functioning of the eye. In particular, the membrane produced in accordance with the present invention 0.20 mm on the average produced may be as thin as about 0.10 mm. except for a pupillary portion which performs a refractive function and whose radii of curvature, anterior and posterior are determined by the required focal length as dictated by the opthalmic prescription.

Generally, the membrane made in accordance with the present invention from the composition described herein has a stable refractive index of 1.409 under accepted standard conditions.

The preferred characteristics of the present composition and contact lens are set forth below as are the methods by which they were determined as follows:

| PROPERTY | ASTM TEST METHOD | RANGE | MEDIAN |
|---|---|---|---|
| Hardness, Shore A Durometer | D7.85 | about 15–95 | 32 |
| Specific Gravity | D1505 | about 0.95–1.04 | 1.02 |
| Tensile Strength PSI | D882 | about 100 psi–1,000 psi | 800–925 |
| Elongation % | D882 | about 120–250 | 150 |
| Tearing Strength lb. | D1004 | about 10–30 | 25 |
| Water Absorption %* | D570 | about 0–3 | 0.5 |

*The water absorption of the material was determined by immmersing specimen which was one-eighth inch thick in a saline solution at 80/F. It was allowed to remain for two weeks and the weight increment was measured. The weight increment was found not to exceed 0.12% of the one-eighth inch specimen.

Permeability to gas
(Std cc) (cm thickness)

| (Seconds) (s of cm area) (cm Hg pressure drop) | | | |
|---|---|---|---|
| $O_2$ permeability | D1434 | about $(29-62 \times 10^{-9})$ | $59 \times 10^{-9}$ |
| $CO_2$ Permeability | D1434 | about $(180-315) \times 10^9$ | $300 \times 100^{-9}$ |
| Index of Refraction | D542 | about 1.390–1.50 | $1.409 \pm .01$ |

The above properties compare favorably with those of the unmodified silicone elastomer, e.g. a commercially available dimethyly polysiloxane/methyl hydrogen siloxane system (DMPS). However, the compositions of the present possesses important properties which make them particularly suitable for use in ocular membranes, which properties are not possessed by the conventional DMPS.

| PRESENT INVENTION | | DMPS | |
|---|---|---|---|
| wetting angle | 20°30' | 60°40' | |
| lipophobia | good | none | |
| mucophobia | good | none | |

As noted herein above, the relative proportions of the ester and polysiloxane in the final product will vary depending on the particular materials used and final properties desired. Typically, for example, when the ester used is 2-hydroxypropyl methacrylate, it is best to use between 0.1 to 5 percent by weight under 0.5 to 2 percent by weight being preferred.

The upper limit in this instance is important from the standpoint of light transmission. Thus, at 2-hydroxypropyl methacrylate levels of more than about 5 percent by weight, the light transmission is reduced to less than about 79 percent, which makes such material less suitable as an optical material. Conversely, at least about 0.1 percent is required to produce the desired properties of wettability, lipophobia, mucophobia, etc. Obviously, for a given choice of materials, the amount of the ester should be that amount effective to produce at least about 80% light transmission as well as maintain the desired levels of lipophobia, wettability, mucophobia and minimal dust affinity.

For the above measurements, the wetting angle was measured by the Poster inverted air bubble method. This is a simulated in vivo method carried out on flat samples which were soaked for seven days in normal saline. The specific procedure used is as outlined in *International Contact Lens Clinic*, Vol. 5 No. 1, January-February 1978.

Lipophobia was determined in an emulsion of 93% normal saline 5% vegetable oil and 2% starch. Fully hydrated samples were immersed for 30 seconds, withdrawn from emulsion and washed in normal saline for 30 seconds. The integrity of water film was observed visually.

Mucophobia was determined by empirical observation of samples of membranes placed on the corneas of rabbits for 21 days. Samples were fully hydrated prior to insertion. Full hydration is achieved in 48 hours of immersion in an aqueous medium.

The following table shows the effects of varying amounts of the ester, 2-hydroxypropyl methacrylate (2-HPMA), in the composition:

| FORMULATION SILOXANE | 2-HMPA WEIGHT % | IMMERSION TIME NEEDED TO ACHIEVE FULL HYDRATION | REJECTION OF MUCUS, LIPIDS AND PARTICULATE DEBRIS |
|---|---|---|---|
| 100 | 0 | 14 days | poor |
| 99.9 | 0.1 | 7 days | fair |
| 99.8 | 0.2 | 48 hrs. | good |
| 99.5 | 0.5 | 29 hrs. | good |
| 99.0 | 1.0 | 12-18 hrs. | good |
| 98.0 | 2.0 | 12-18 hrs. | good |
| 97.0 | 3.0 | 12-18 hrs. | good |
| 95.0 | 5.0 | 12-18 hrs. | excellent |

By "full hydration", it is meant that a continuous uninterrupted film of liquid (normal saline) may be established on the surface of the material. The establishment of such a film may be determined by visual observation. The property is inherently tied in with the "wettability" of the film and is essentially another parameter which can be used to characterize the suitability of the material for use as an ocular membrane in contact with the eye.

The importance of this property is that once full hydration has been obtained, the continuous uninterrupted film is established and the membrane may be exposed to the air at ambient temperatures and the integrity of the film will be sustained for varying lengths of time. The following table shows the effect of variations in composition on the length of time for which the film will be maintained (after full hydration):

| | FORMULATION | | DURATION OF FILM |
|---|---|---|---|
| | POLYSILOXANE | 2-HPMA | |
| a. | 100 | 0 | 20-50 minutes |
| b. | 99.9 | 0.1 | 35-65 minutes |
| c. | 99.2 | 0.2 | 120-150 minutes |
| d. | 99.5 | 0.5 | 140-180 minutes |
| e. | 99.0 | 1.0 | 160-180 seconds |
| f. | 98.0 | 2.0 | 160-180 seconds |
| g. | 97.0 | 3.0 | 160-180 seconds |
| h. | 95.0 | 5.0 | 150-180 seconds |

In use, of course, ocular membranes in contact with the eye made from the composition of the present invention will be an environment of aqueous corneal fluid. Thus, the film established at full hydration is assured. When blinking, the lid interrupts and re-wets the anterior surface of the membrane with corneal fluid. At a minimal blink rate of 2 to blink per minute, the membrane in accordance with the present invention maintains a continuous film at all times. However, since the corneal fluid contains the lipid and mucous debris, the continuous wetting and rewetting of the surface of the membrane provides ample opportunity for the debris to collect on and adhere to the membrane, depending on the affinity of the membrane material for the debris.

It is thus important that the surface of the material not only wet, i.e., attract water, but also, reject the lipid and mucous debris. Otherwise the membrane will become coated with the debris and this will result in reduced transmission and lower visual acuity.

To evaluate the effect of composition on the lipophobic and mucophobic properties of membranes, the following experiments were carried out:

An emulsion to simulate the corneal fluid (loaded with mucous and lipids) was prepared by mixing 2 percent by weight starch, 3 percent by weight vegetable oil and 95 percent saline (0.9 N Nacl) thoroughly for 30 minutes in a Waring blender.

Fully hydrated membranes were immersed in the emulsion for 30 seconds, immersed in distilled water for 30 seconds and then visually evaluated for the presence of an uninterrupted continuous film of water. The results are as follows:

| COPOLYMER FORMULATION | | SURFACE HYDRO-PHILIC | SURFACE LIPOPHILIC | SURFACE MUCO-PHOBIC |
|---|---|---|---|---|
| 2-HMPA | $DMPS_{RTV}$ | | | |
| (a) 0.0 | 100.0 | poor | excellent | excellent |
| (b) 0.1 | 99.9 | fair | very good | very good |
| (c) 0.2 | 99.8 | good | good | good |
| (d) 0.3 | 99.7 | good | fair | fair |
| (e) 0.5 | 99.5 | excellent | poor | poor |
| (f) 1.0 | 99.0 | excellent | poor | poor |
| (g) 2.0 | 98.0 | excellent | poor | poor |
| (h) 3.0 | 97.0 | excellent | poor | poor |
| (i) 5.0 | 95.0 | excellent | poor | poor |

EXAMPLES 1–13

In these examples, flat films of copolymers and terpolymers in accordance with the present invention were prepared using varying amounts of the esters as indicated. The flats were prepared by first preparing the polysiloxane. This was prepared by mixing 10 grams of dimethylpolysiloxane with about 0.25 mil percent vinyl substitution and 1.5 grams of methyl hydrogen siloxane containing a catalytic amount of chlorpatinic acid alcoholate. 11.5 grams of this mixture were mixed with the ester or esters indicated to which 3 percent by weight of butyl octoate as a catalyst was added. The mixture was agitated for 10 minutes in a rotary mixer at 1250 r.p.m. and then permitted to de-air at ambient temperatures for one hour.

Flats were prepared from these mixtures by delivering 0.16 grams of the mixture at ambient temperature on to a level polished polymethylmethacrylate plate using a polymethyl pentene syringe having a 2.0 mm opening. The plate was placed in an air circulating oven at 90° C. to completely cure the sample. Depending on the composition used, the curing time varied from about 40 minutes to 8 hours.

The thus formed film (or flat) having a thickness of about 1 mm was cut into 4 mm×16 mm strips and analyzed for light transmittance, wetting properties, elongation and anti-static properties. Not all of the samples were analyzed for each property. The analyses were carried out as follows:

Light Transmission

The sample was placed in a 0.5 mm square curvette in a 0.9% saline (normal saline). The transmission was measured against normal saline solution using a Lumitron-15 Photocolorimeter, Photovolt, Inc.

Wetting

The sample was immersed in normal saline for 24 hours. The sample was removed and held in a vertical position and the elapsed time of duration of the integrity of the aqueous film on the sample was measured. Six determinations were made for each sample at ambient temperature (63° F.) at 35 to 40 percent humidity, and the average of the six are reported.

The characterization of the duration time of the film was as follows:

| | |
|---|---|
| 90 seconds or more | = excellent |
| 60 to 89 seconds | = good |
| 40 to 59 seconds | = fair |
| less than 40 seconds | = poor |

Elongation

The sample was elongated at constant force until it broke. The increase in length till breaking is reported in terms of percentage of original length.

Antistatic Properties

This was a qualitative test to characterize the antistatic properties of the flat sample. Finely powdered cigar ash was placed on a dry, flat sample to completely cover surface of the sample. The ash was then blown off using a 60 second compressed (50 psi) air blast through a ⅛ inch nozzle placed on half inch from the sample. The amount of ash remaining on the surface was measured by using a 0.01 mm grid under 20x magnification. The results were characterized as follows:

| percent of grid squares remaining covered | |
|---|---|
| 2% or less | excellent |
| 2 to 5% | very good |
| 5 to 7% | good |
| 7 to 10% | fair |
| more than 10% | poor |

Water Absorbtion

The sample was immersed in normal saline at ambient temperature (77° F.). The increment in weight after one week of immersion was measured.

EXAMPLE 1

Copolymer of polydimethylsiloxane with propylene glycol monomethacrylate.

| AMOUNT OF ESTER, WT % | LIGHT TRANS. % | ELONGATION % | WETTING | ANTI-STATIC | H₂O AB-SORBTION % |
|---|---|---|---|---|---|
| 0.2 | 90 | | | | |
| 0.5 | 90 | | | | |
| 1.0 | 88 | 35 | excellent | excellent | 0.5 |
| 2.0 | light haze | 25 | | | |
| 3.0 | haze, opaque | | | | |

NOTE:
Curing inhibited on steel alloys.

EXAMPLE 2

Copolymer of polydimethylsiloxane with 1,4 butylene glycol monomethacrylate.

| AMOUNT OF ESTER, WT % | LIGHT TRANS. % | ELONGATION % | WETTING | ANTI-STATIC | H₂O AB-SORBTION |
|---|---|---|---|---|---|
| 0.2 | over 90 | | poor | | |
| 0.5 | over 90 | | fair | | |
| 1.0 | over 90 | | good | | |
| 2.0 | | 60 | excellent | good | |
| 3.0 | | | excellent | | |
| 4.0 | | | excellent | | |
| 5.0 | | | excellent | | |
| 7.5 | 86 | | excellent | | |

EXAMPLE 3

Copolymer of polydimethylsiloxane with hexamethylene glycol diacrylate.

| AMOUNT OF ESTER, WT % | LIGHT TRANS % | ELONGATION % | WETTING | ANTI-STATIC | H₂O AB-SORBTION |
|---|---|---|---|---|---|
| 0.2 | | | poor | | |
| 0.5 | | | poor | | |
| 1.0 | 89 | | good | | good |
| 2.0 | 89 | | fair | | fair |
| 3.0 | 89 | | good | | fair |
| 4.0 | 85 | | good | | fair |
| 5.0 | 70 | | good | | |
| 7.5 | opaque | | | | |

EXAMPLE 4

Copolymer of polydimethylsiloxane with hexamethylene glycol dimethacrylate.

| AMOUNT OF ESTER, WT % | LIGHT TRANS % | ELONGATION % | WETTING | ANTI-STATIC | H$_2$O ABSORPTION % |
|---|---|---|---|---|---|
| 0.2 | | | poor | | |
| 0.5 | | | poor | fair | |
| 1.0 | 88 | | excellent | | |
| 2.0 | clear | | | | |
| 3.0 | clear | | excellent | good | |
| 4.0 | clear | | excellent | | |
| 5.0 | clear | | good | poor | |
| 6.0 | clear | | good | | |
| 7.5 | clear | | good | | |
| 10.0 | clear | | excellent | | |

EXAMPLE 5

Copolymer of polydimethylsiloxane with 2-methoxyethylmethacrylate.

| AMOUNT OF ESTER, WT % | LIGHT TRANS % | ELONGATION % | WETTING | ANTI-STATIC | H$_2$O ABSORPTION % |
|---|---|---|---|---|---|
| 0.2 | | | poor | poor | |
| 0.5 | | | poor | poor | |
| 1.0 | 90 | 50 | good | | 0.7 |
| 2.0 | | | | | |
| 3.0 | | | | | |
| 4.0 | | | | | |
| 5.0 | | | | | |
| 7.5 | | | poor | poor | |

EXAMPLE 6

Copolymer of polydimethylsiloxane with 2-methoxyethylacrylate

| AMOUNT OF ESTER, WT % | LIGHT TRANS % | ELONGATION % | WETTING | ANTI-STATIC | H$_2$O ABSORPTION % |
|---|---|---|---|---|---|
| 0.2 | 91 | | fair | fair | |
| 0.5 | 91 | | fair | fair | |
| 1.0 | 91 | | good | | 0.8 |
| 2.0 | 91 | | fair | | |
| 3.0 | 91 | | fair | | |
| 4.0 | 91 | | fair | | |
| 5.0 | 91 | | poor | | |
| 7.5 | 91 | | good | | |
| 12.5 | 91 | | good | | |

EXAMPLE 7

Copolymer of polydimethylsiloxane with tetramethylene glycol diacrylate.

| AMOUNT OF ESTER WT % | LIGHT TRANS % | ELONGATION % | WETTING | ANTI-STATIC | H$_2$O ABSORPTION % |
|---|---|---|---|---|---|
| 0.2 | 90 | | fair | | |
| 0.5 | 90 | | fair | | |
| 1.0 | 90 | | good | | |
| 2.0 | 90 | | good | | |
| 3.0 | 88 | | excellent | | |
| 4.0 | 85 | | | | |

EXAMPLE 8

Copolymer of polydimethylsiloxane with tetramethylene glycol dimethacrylate.

| AMOUNT OF ESTER WT % | LIGHT TRANS % | ELONGATION % | WETTING | ANTI-STATIC | H$_2$O ABSORPTION % |
|---|---|---|---|---|---|
| 0.2 | | | poor | poor | |
| 0.5 | | | fair | | |
| 1.0 | 90 | | good | good | |
| 2.0 | | | good | excellent | |
| 3.0 | 90 | | good | | |
| 4.0 | | | excellent | | |
| 5.0 | | | excellent | | |

EXAMPLE 9

Copolymer of polydimethylsiloxane with neopentyl glycol diacrylate.

| AMOUNT OF ESTER WT % | LIGHT TRANS % | ELONGATION % | WETTING | ANTI-STATIC | H$_2$O ABSORPTION % |
|---|---|---|---|---|---|
| 0.2 | 90 | | poor | poor | |
| 0.5 | 90 | | poor | poor | |
| 1.0 | 90 | | fair-poor | fair | |
| 2.0 | 90 | | excellent | good | |
| 3.0 | 89 | | excellent | good | |
| 4.0 | 89 | | excellent | good | |
| 5.0 | 88 | | excellent | good | |
| 7.5 | slight haze | | excellent | good | |

EXAMPLE 10

Copolymer of polydimethylsiloxane with nepentyl glycol methacrylate.

| AMOUNT OF ESTER WT % | LIGHT TRANS % | ELONGATION % | WETTING | ANTI-STATIC | H$_2$O ABSORPTION % |
|---|---|---|---|---|---|
| 0.2 | clear | | | poor | |
| 0.5 | 90 | | | poor | |
| 1.0 | 90 | | poor | fair | |
| 2.0 | 90 | | fair | good | |
| 3.0 | 90 | | fair | good | |
| 4.0 | 90 | | fair | good | |
| 5.0 | 90 | | excellent | good | |
| 7.5 | 90 | | | good | |
| 10.0 | 90 | | | good | |

EXAMPLE 11

Terpolymer of polydimethylsiloxane with Ester I, 2-hydroxypropylmethacrylate, and Ester II, tetramethlene glycol diatmethacrylate.

| AMOUNT OF ESTER WT % | | LIGHT TRANS % | ELONGATION % | WETTING | ANTI-STATIC | H$_2$O ABSORPTION % |
|---|---|---|---|---|---|---|
| I | II | | | | | |
| 0.5 | 0.5 | 90 | 45 | fair | | |
| 1.0 | 1.0 | 90 | 40 | good | | |
| 2.0 | 1.0 | 90 | 40 | good | | |
| 1.0 | 2.0 | 90 | 40 | good | | |
| 3.0 | 1.0 | haze | | | | |

NOTE:
Cure inhibited by steel dies.

EXAMPLE 12

Terpolymer of polydimethylsiloxane with Ester I, 2-hydroxypropylmethacrylate, and Ester II, tetramethylene glycol diacrylate.

| AMOUNT OF ESTER WT % | | LIGHT TRANS % | ELONG-ATION % | WET-TING | ANTI-STATIC | $H_2O$ AB-SORB-TION % |
|---|---|---|---|---|---|---|
| I | II | | | | | |
| 0.5 | 0.5 | 90 | 40 | fair | | |
| 1.0 | 1.0 | 89 | 38 | good | | |
| 2.0 | 1.0 | 88 | 38 | good | | |
| 1.0 | 2.0 | haze | | | | |
| 3.0 | 1.0 | haze | | | | |

EXAMPLE 13

Terpolymer of polydimethylsiloxane with Ester I, 2-hydroxpropylmethacrylate, and Ester II, 2-methoxyethylacrylate.

| AMOUNT OF ESTER WT % | | LIGHT TRANS % | ELONG-ATION % | WET-TING | ANTI-STATIC | $H_2O$ AB-SORB-TION |
|---|---|---|---|---|---|---|
| I | II | | | | | |
| 0.5 | 0.5 | 91 | 50 | good | good | |
| 1.0 | 1.0 | 91 | 48 | good | | |
| 2.0 | 1.0 | 91 | 45 | good | | |
| 1.0 | 2.0 | 90 | 45 | good | | |
| 3.0 | 2.0 | slight haze | 40 | good | | |
| 2.0 | 3.0 | 86 | 40 | good | | |

Membranes from each of the copolymers and terpolymers described in TABLE 2 hereinbelow were prepared by placing the specified mixture into a closed cell formed by marrying two mold members made of polyacrylic resin (Carboset XLII-B.F. Goodrich) having the desired optical geometry. The mixtures and components were prepared in the same manner as for the flat samples. The mixture in the closed cell was cured using the conditions described hereinabove for the preparation of the flats. After curing, the molds were destroyed by dissolution in isopropanol thus freeing the membranes.

The thus obtained membranes were clinically tested on humans with continuous periods of wear ranging from 24 to 72 hours. The membranes exhibited good optical definition, good mucophobicity and lipophobicity which resulted in satisfactory levels of visual acuity over the entire wearing period, the lenses were tolerated well by the wearers and no corneal insult was observed.

Membrane 20 was tested in rabbits for six weeks and no corneal insult was observed.

TABLE 2

| MEMBRANE NO. | COMMENTS | ESTER NO. (from TABLE 1) | % WEIGHT |
|---|---|---|---|
| 1 | | 9 | 1.0 |
| 2 | | 10 | 1.0 |
| 3 | terpolymer | 7 | 1.0 |
|   | | 1 | 1.0 |
| 4 | terpolymer | 6 | 3.5 |
|   | | 1 | 1.0 |
| 5 | | 6 | 5.0 |
| 6 | | 6 | 4.0 |
| 7 | | 6 | 3.0 |
| 8 | | 6 | 2.0 |
| 9 | | 6 | 2.0 |
| 9 | | 6 | 7.0 |

TABLE 2-continued

| MEMBRANE NO. | COMMENTS | ESTER NO. (from TABLE 1) | % WEIGHT |
|---|---|---|---|
| 10 | | 6 | 3.0 |
| 11 | | 6 | 1.0 |
| 12 | | 1 | 1.0 |
| 13 | | 1 | 1.0 |
| 14 | | 1 | 1.0 |
| 15 | terpolymer | 1 | 1.0 |
|   | | 7 | 1.0 |
| 16 | | 7 | 1.0 |
| 17 | | 3 | 1.0 |
| 18 | | 4 | 1.0 |
| 19 | | 5 | 1.0 |
| 20 | | 1 | 1.0 |
| 21 | terpolymer | 6 | 1.0 |
|   | | 1 | 1.0 |
| 22 | | 6 | 1.0 |
| 23 | terpolymer | 1 | 1.0 |
|   | | 8 | 1.0 |
| 24 | | 8 | 1.0 |
| 25 | | 10 | 2.0 |
| 26 | | 9 | 2.0 |
| 27 | | 10 | 3.0 |

What is claimed is:

1. A composition comprising a uniform polymer selected from the group consisting of a copolymers and terpolymers of an addition cross-linked polysiloxane and one or more esters having the formula:

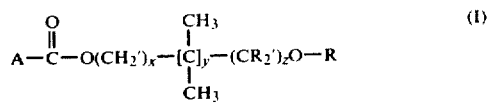

wherein:

A is $CH_2=CH-$ or

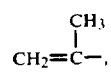

R' may be the same or different in each occurence and may be hydrogen or methyl, R is hydrogen, lower alkyl having one to three carbon atoms,

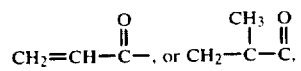

x and z are integers from 0 to 4, y is 0 or 1, the sum of x and z is one or more, and when y is 1, x and z are equal, the amount of the ester in the polymer being effective to provide the composition with sufficient light transmission, liphobicity, mucophobicity, and surface wettability, for wearing in contact with the human eye but less than that which would make the composition water swellable.

2. The composition of claim 1, wherein the polysiloxane is dimethylpolysiloxane.

3. The composition of claim 1, having a refractive index in the range from about 1.390 to 1.500.

4. The composition of claim 1 wherein the amount of said ester is in the range from about 0.2 to 5 percent by weight based on the total weight of the polymer.

5. The composition of claim 1 wherein the polysiloxane is dimethylpolysiloxane having up to about 1 percent of the methyl groups being replaced by vinyl groups.

6. The composition of claim 1 wherein the ester is a mono ester.

7. The composition of claim 1 wherein the ester is a diester.

8. The composition of claim 1 wherein the ester is a mixture of mono and diesters.

9. The composition of claim 1, 2, 4, or 5 wherein the ester is selected from the group consisting of: propylene glycol monomethacrylate, 1,4 butylene glycol monomethacrylate, hexamethylene glycol dimethacrylate, hexamethylene glycol diacrylate, 2-methoxy ethylacrylate, 2-methoxy ethyl methacrylate, tetramethylene glycol dimethacrylate, tetramethylene glycol diacrylate, neopentyl glycol diacrylate, and neopentyl glycol dimethacrylate.

10. The composition of claim 1 which further comprises a reinforcing filler in an amount of from about 1 to 50 percent by weight of the polysiloxane.

11. The composition of claims 1 or 5 wherein the composition is a terpolymer consisting essentially of one percent by weight of propylene glycol methacrylate, one percent by weight of 2-methoxylethylacrylate and 98 percent by weight of dimethylpolysiloxane.

12. The composition of claims 1 or 5 wherein the composition is a copolymer and the ester is 2-methoxyethylacrylate in an amount of about 1.12 percent by weight.

13. The composition of claims 1 or 5 wherein the composition is a terpolymer and the esters are about 1.0 percent by weight propylene glycol monomethacrylate and about 1.0 percent by weight tetramethylene glycol diacrylate.

14. The composition of claims 1 or 5 wherein the composition is a copolymer and the ester is 1, 4 butylene gycol monomethacrylate in an amount from about 1 to 4 percent by weight.

15. The composition of claims 1 or 5 wherein the composition is a copolymer and the ester is neopentyl glycol dimethacrylate in an amount of about 3 percent by weight.

16. A composition comprising a copolymer of addition cross-linked dimethylpolysiloxane and propylene glycol monomethacrylate the amount 2-hydroxypropylmethacrylate being in the range from about 0.5 to 2 percent by weight, based on the total weight of the copolymer.

17. A composition comprising a uniform terpolymer of addition cross-linked dimethylpolysiloxane and two esters, having the formula:

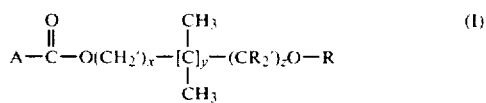

wherein:

A is $CH_2=CH-$ or

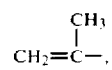

R' may be the same or different in each occurence and may be hydrogen or methyl, R is hydrogen, lower alkyl having one to three carbon atoms,

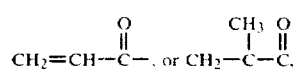

x and z are integers from 0 to 4, y is 0 or 1, the sum of x and z is one or more, and when y is 1, x and z are equal, wherein one of the esters is propylene glycol monomethacrylate, the total amount of the two esters being effective to provided the composition with sufficient light transmission, liphobicity, mucophobicity, and surface wettability, for wearing in contact with the human eye, but less than that which would make the composition water swellable.

18. The composition of claim 17 wherein the amount of the esters is from about 0.2 to 5 percent by weight based on the total weight of the terpolymer.

* * * * *